(No Model.)
G. W. RUSH.
STRAINER.
No. 416,952. Patented Dec. 10, 1889.
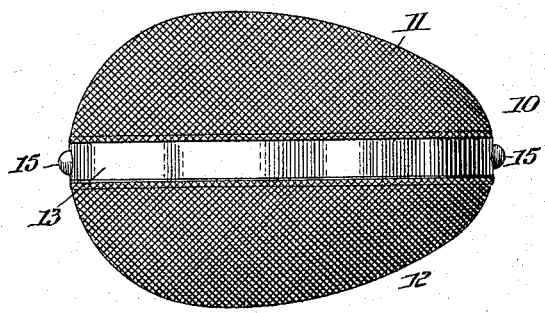
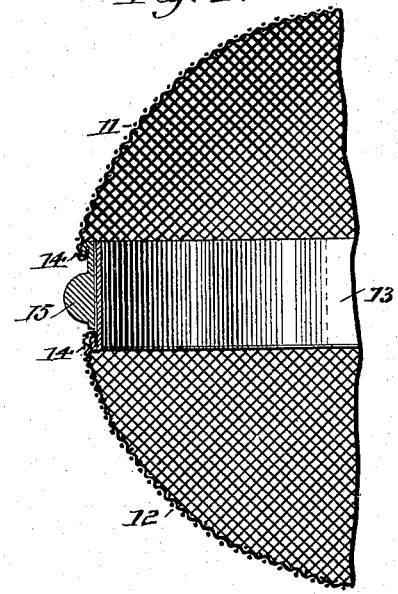
WITNESSES:
INVENTOR:
G. W. Rush
BY Munn & Co
ATTORNEYS.

UNITED STATES PATENT OFFICE.

GEORGE W. RUSH, OF BRIDGETON, NEW JERSEY.

STRAINER.

SPECIFICATION forming part of Letters Patent No. 416,952, dated December 10, 1889.

Application filed June 18, 1889. Serial No. 314,751. (No model.)

*To all whom it may concern:*

Be it known that I, GEORGE W. RUSH, of Bridgeton, in the county of Cumberland and State of New Jersey, have invented a new and useful Improvement in Strainers, of which the following is a full, clear, and exact description.

This invention relates to devices for extracting the essential principles of tea and coffee for use as a beverage.

Its object is to provide a strainer capable of use in any ordinary coffee or tea pot of any size, by means of which the coffee or tea therein may be quickly and thoroughly boiled or steeped, the full aroma and flavor thereof preserved, and the fluid extract rendered clear and free from sediment without necessitating recourse to the agents commonly employed to settle and clarify the same.

Reference is to be had to the accompanying drawings, forming a part of this specification, in which similar figures of reference designate corresponding parts in both the views.

Figure 1 is a side view of the strainer in closed condition, and Fig. 2 is a partial vertical section of the same.

In carrying out the invention the strainer 10 is constructed in two parts 11 and 12, each having the shape of half an egg. The material employed is by preference steel wire-gauze, the mesh of which is of such size as to permit water to have free passage to and through the contents of the strainer during boiling or steeping, and yet prevent the tea-leaves or coffee-grains from passing out and mixing with the water. Each of said parts has fixed to its edge an imperforate band 13, of tin or other suitable metal, bent over upon itself at one edge to form a lip 14, between which and the body of the band the edge of the wire-gauze is introduced and secured therein by bending the lip upon the same, as shown best in Fig. 2 of the drawings. Said bands are adapted to be telescoped one within the other, as also best shown in the last-named figure, the strainer then presenting an egg-shaped appearance, as shown in Fig. 1 of the drawings. To facilitate the separation of the parts of the strainer, one or the other of said bands is provided with knobs or buttons 15, as shown. Any other suitable device for the purpose—as rings swiveled to the band—may be adopted, if preferred.

In use, the requisite quantity of tea or coffee having been placed in the strainer and its parts fitted together, as shown, it is dropped into the coffee or tea pot, the proper quantity of boiling water poured upon it, and the pot then placed upon a stove, range, or other heating medium, as ordinarily.

The weight of the strainer and its contents normally retains it at the bottom of the utensil employed, and as the water is allowed to boil, either gently or briskly, as the case may be, it has free access and passage to and through the contents of the strainer and draws out the essence of the same quickly and thoroughly. The brisk boiling of the water in the preparation of coffee, by reason of the egg shape of the strainer, causes the latter to be rapidly turned or revolved in the water, still further facilitating the extraction of the essence of the strainer's contents.

While the strainer has been described as constructed, by preference, of wire-gauze, the body of its parts may be made of perforated metal with equal advantage as to its use and results; and it will be understood that the wire-gauze or metal body may be plated with any other suitable metal to enhance its appearance or prolong its usefulness.

By the use of this invention the preparation of tea or coffee is greatly expedited, and the extract obtained is rendered clear and substantially free from sediment, while the flavor and aroma of the coffee or tea are preserved in the extract.

The strainer may be made of any size for use in any ordinary tea or coffee pot, is not liable to get out of order, and, being in two parts, is readily separable for cleaning or other purpose.

Having thus described my invention, what I claim as new, and desire to secure by Letters Patent, is—

The strainer 10, constructed in two parts 11 and 12, of corresponding size and contour, each having a reticulated body and an imperforate band 13, having a lip 14 secured to the edge of said body, said bands being adapted to be telescoped one within the other, and projections 15 on the outer face of one of said bands, substantially as shown and described, for the purpose set forth.

GEORGE W. RUSH.

Witnesses:
CHAS. D. REEVE,
JOSEPH H. SHELDON.